UNITED STATES PATENT OFFICE.

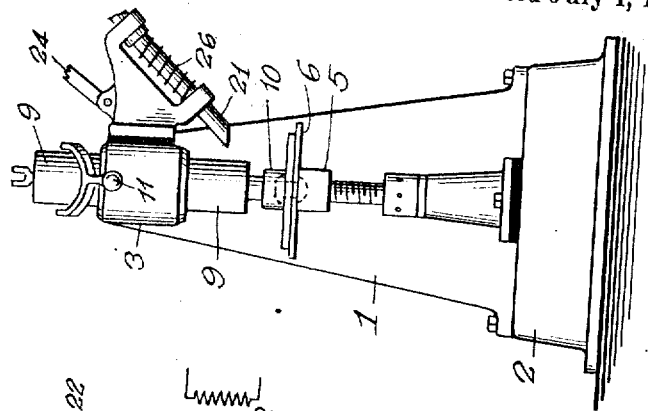
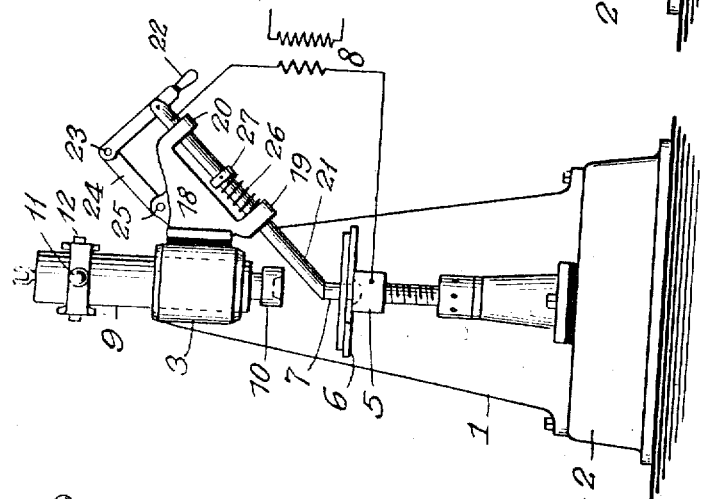
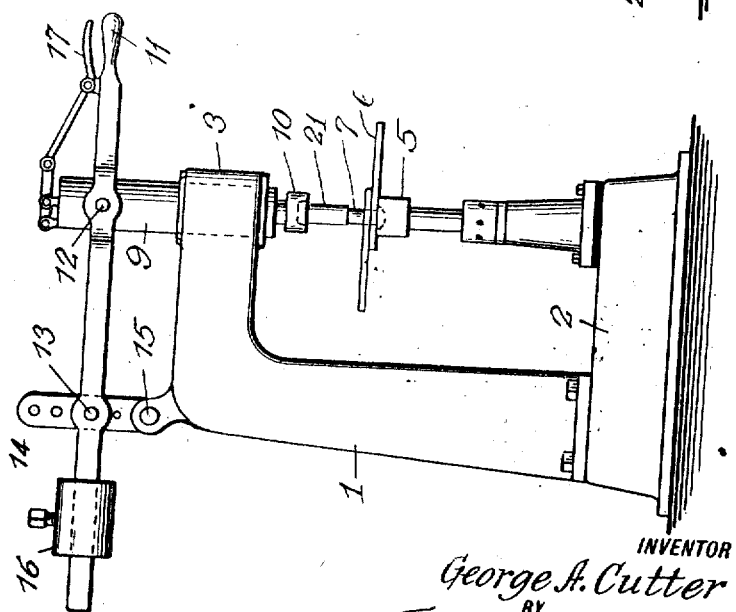

GEORGE ALBERT CUTTER, OF DEDHAM, MASSACHUSETTS, ASSIGNOR TO THOMSON ELECTRIC WELDING COMPANY, OF LYNN, MASSACHUSETTS, A CORPORATION OF MASSACHUSETTS.

ELECTRIC METAL-WORKING APPARATUS.

1,308,399.   Specification of Letters Patent.   Patented July 1, 1919.

Application filed November 4, 1918. Serial No. 260,939.

*To all whom it may concern:*

Be it known that I, GEORGE ALBERT CUTTER, a citizen of the United States, and a resident of Dedham, in the county of Norfolk and State of Massachusetts, have invented certain new and useful Improvements in Electric Metal-Working Apparatus, of which the following is a specification.

My invention relates to electric metal working apparatus in which the work is first heated by the passage of an electric current through or across it, and is then acted on by a separate pressure device to shape, forge, rivet or weld it.

The object of the invention is to provide a simple construction of that type of apparatus in which separate heating pressure dies are employed and which will be of low cost to manufacture as well as simple and efficient in operation.

The invention is particularly adapted for and has marked utility in electric riveting apparatus in which the rivet is first heated by the passing of an electric current therethrough and then headed by a separate pressure die and it will be herein shown and described as carried into effect in a machine for this purpose. It will be understood however, that the invention may be utilized in machines for other purposes, such as forging, welding or any other use to which it may be adapted.

The invention consists in the improved construction and arrangement of electric metal working apparatus hereinafter more particularly described and then specified in the claims.

In the accompanying drawings,—

Figure 1 is a side elevation of an electric riveting machine constructed in accordance with this invention.

Fig. 2 is a front elevation of the same, the electric transformer and connections being shown diagrammatically. In this view the parts are shown in the position when the rivet is being heated.

Fig. 3 is a view similar to Fig. 2 but showing the parts in position just at the conclusion of the heading operation.

Referring to the drawings, 1 indicates the framework of the machine which in the present case is of the vertical type. 2 indicates the base and 3 indicates the head in the form of a forwardly projecting arm.

A standard 4 rising from and secured to but suitably insulated from the base 2 is provided with a vertically adjustable die 5. The die 5 forms a support upon which the work in the form of two lapped plates 6 is placed. The plates are to be secured together by a rivet 7 which passes up through perforations in the plates and has an end projecting upward therefrom. In the case shown the rivet has a rounded head which seats in a suitably formed recess in the die 5. The die 5 is of copper or other good conducting material and forms one terminal of the secondary of the usual transformer 8.

The transformer 8 which is of the usual construction employed in the art may, as will be readily understood by those skilled in the art, be inclosed within or otherwise secured to the framework 1, it being merely shown diagrammatically in the drawings for the sake of clearness.

The pressure device for heading the rivet preferably is pneumatically operated and in the case illustrated is an ordinary pneumatic hammer.

9 indicates the air cylinder of the pneumatic hammer receiving its air in any suitable way and having a plunger or hammer operating a number of comparatively light blows as in the well known pneumatic hammer in wide commercial use.

The cylinder 9 is mounted vertically in the head 3 and is bodily reciprocal therein to bring the heading die 10 into contact with the end of the rivet 9 to head the same by a multiplicity of blows as in the ordinary portable riveter after the rivet has been heated in the manner to be presently described.

The cylinder 9 is forced downward by means of a lever 11 pivoted at 12 to the cylinder and adjustably fulcrumed at 13 to a link 14 pivoted at 15 to the framework of the machine. The lever 11 extends rearwardly from the fulcrum 13 and is provided with a weight 16 which acts to return the cylinder 1 to its upper position after the lever 11 is released.

17 indicates the control lever mounted on the lever 11 for controlling the air valve which actuates the plunger of the hammer in the usual manner.

18 indicates a bracket mounted on one side of the head 3 and insulated therefrom. The bracket 18 is provided with a pair of arms 19, 20 in which a bar of copper or other good conducting material 21 is freely mounted. The bar 21 is connected to and constitutes the other terminal of the secondary of the transformer 8 and is hereinafter called the "electrode."

The electrode 21 is disposed at an acute angle to the line of travel of the cylinder 9 and its end is so shaped that, when the electrode is moved to proper position, it makes flat contact with the end of the rivet 7. The electrode is moved to such position by means of a handle 22 connected thereto and pivoted at 23 to a link 24 pivotally mounted at 25 on the bracket 18. When the electrode 21 is brought into engagement with the rivet end by the handle 22 a spring 26 is compressed between the arm 19 and a collar 27 fixed to the electrode, so that upon release of the handle 22 the spring 26 automatically withdraws the end of the electrode from the path of travel of the hammer die 10.

In the operation of the machine the work is placed on the lower die or support 5 with the rivet 7 projecting upward through the plates to be joined. The pneumatic cylinder and its hammer die 10 are in the position shown in Fig. 2, that is free of the work. The electrode 21 is brought into contact with the end of the rivet 7 by means of the handle 22. The electric current now being turned on in any of the usual ways employed in the art, the rivet 7 and particularly its projecting end is heated by the passage of the current. When the rivet end has reached the desired degree of plasticity the handle 22 is released and the electrode 21 is automatically withdrawn.

The lever 11 is now depressed and the cylinder 9 is bodily lowered until the die 10 is brought into contact with the heated rivet end at which time the control lever 17 is actuated. This brings the pneumatic hammer into operation and blows are struck on the end of the rivet by the die 10 until the same has been properly headed. Upon release of the lever 11 the cylinder 9 and die 10 return to their upper position due to the weight 16.

It will be understood that the invention is not limited to the particular details of construction shown and described but that the same may be modified and varied without departing from the spirit and scope of the invention as expressed in the appended claims.

What I claim as my invention is:—

1. An electric metal working machine comprising a support for the work, a vertically movable plunger adapted to act on the heated section of work and an electrode reciprocally mounted at an angle on one side of the machine and adapted to contact with the section of work to be heated.

2. An electric metal working machine comprising a frame having a support for the work, a pneumatically operated plunger movable vertically to engage the heated section of the work, a bracket at one side of the frame and a reciprocable electrode mounted in said bracket at an angle to the line of operation of the plunger and adapted to engage the section of work in line with said plunger.

3. An electric metal working machine comprising a framework having a support for the work, a pneumatic hammer mounted in said framework and adapted to operatively act on the section of work to be operated on and an electrode reciprocally mounted at an angle on one side of said framework and adapted to contact with the section of work to be heated.

4. An electric metal working machine comprising a framework having a support for the work, a pneumatic hammer bodily slidable in said framework to and from the work and an angularly disposed electrode on one side of the framework adapted to be reciprocated into and out of the path of travel of said hammer to engage and heat the section of work to be acted on by said hammer.

5. An electric metal working machine comprising a framework having a support for the work, a pneumatic hammer mounted in the head of said framework and bodily movable therein toward and from the work, a lever for bodily moving said hammer, a device carried by said lever for controlling the hammer operations on the heated section of work and an electrode mounted at one side of said framework and adapted to engage the section of work to be heated.

6. An electric metal working machine comprising a framework having a support for the work, a pneumatic hammer slidably mounted in the head of said framework, a lever for moving said hammer bodily toward the work, an actuating device mounted on said lever for controlling the action of the hammer on the heated section of work, an electrode mounted at an angle at one side of the framework and adapted to engage the section of work to be heated and means for automatically withdrawing said electrode.

7. An electric riveting apparatus, comprising a framework provided with a support upon which the work is placed with the rivet passing upwardly through the work, a pneumatic hammer movable bodily in the head of the framework toward and from the projecting rivet end, means for controlling the blows of said hammer after it has been moved into contact with the rivet end and an electrode reciprocally mounted at an angle at one side of the hammer and adapted to engage the end of the rivet as and for the purpose described.

8. An electric riveting apparatus comprising a framework provided with a support upon which the work is placed with the rivet passing upwardly through the work, a pneumatic hammer mounted in the head of the framework and bodily movable toward and from the work, an operating lever for bodily moving the hammer, controlling devices for the hammer mounted on said lever, an angularly disposed electrode mounted on one side of the framework and adapted to move into the path of the hammer to engage the rivet end and means for automatically withdrawing said electrode from the path of the hammer.

Signed at Boston in the county of Suffolk and State of Mass. this 31 day of October A. D. 1918.

GEORGE ALBERT CUTTER.

Witnesses:
  C. F. TISCHNE,
  IRENE LEFTOWITZ.